United States Patent Office 3,741,848
Patented June 26, 1973

3,741,848
STITCHING MACHINE FOR RENEWING PNEUMATIC TIRES
Blaine F. Walters, 517 W. Main St.; William E. Stutzman, 617 Tayman Ave.; and Ray S. Fink, 604 Tayman Ave., all of Somerset, Pa. 15501
Filed Aug. 26, 1971, Ser. No. 175,103
Int. Cl. B29h 17/00, 17/02
U.S. Cl. 156—421                                          6 Claims

ABSTRACT OF THE DISCLOSURE

An improved stitching machine for rebuilding or renewing pneumatic tires, especially for rebuilding heavy-duty pneumatic tires bearing a lugged tread. The stitching machines comprises a fixed frame means having movably mounted thereon a carriage means which may be advanced and retracted longitudinally on the frame means. The carriage means includes a swivel frame means having operably mounted thereon roller means adapted to abut the surface of a tire being rebuilt. The roller means is preferably mounted on an arm which is operably connected to means, such as a piston, for urging the roller means against a tire being rebuilt at a pre-selected, constant force. The piston means is swivelly connected to the swivel frame. The roller means on said arm is further operably mounted in said swivel frame for transverse movement therein whereby said roller when forced by said piston means against a tire being rebuilt may move over the surface thereof along a desired, pre-selected path. Suitable means are additionally provided for controlling the transverse movement of said roller.

BACKGROUND OF THE INVENTION (A) Field of the invention

This invention relates to stitching machines for rebuilding or renewing pneumatic tires, and more particularly to a stitching machine for renewing heavy duty pneumatic tires having a lugged tread thereon.

(B) Description of the prior art

In rebuilding pneumatic tires, especially heavy duty pneumatic tires bearing a lugged tread, the crown surface of a used tire carcass is buffed to remove the worn tread and to provide a surface upon which the new tread may be applied. During the rebuilding operation, the tire is mounted upon a support member that has a drive means for rotating the support and hence for rotating the tire thereon. A conventional support is illustrated in Pat. No. 3,511,291. After the tire surface has been buffed, camelback, or base stock, which is an elongated strip of uncured rubber, is positioned upon the buffed crown surface. In some applications, rubber cement is applied to the buffed carcass prior to application of the camelback, and in other applications, a hot extruded base stock, or camelback, is positioned directly upon the buffed carcass. The camelback is then "stitched," or temporarily adhered, to the tire crown surface by exerting a pressure on the outer surface of the camelback. In stitching camelback to a tire carcass it is essential to remove all of the air between the tire crown and the under-surface of the camelback. Otherwise, during subsequent curing operations, expansion of entrapped air may take place and prevent adhesion of the camelback to the tire carcass. In order to remove entrapped air between the tire crown and camelback undersurface, pressure is applied to the camelback by means of a roller beginning at the center of the tire carcass crown and then moving outwardly toward the tire sidewall. That pressure forces any entrapped air out from between the tire crown and camelback.

Another substantial problem in rebuilding heavy duty, lugged-tread bearing pneumatic tires is to properly stitch the lugs to the tire crown and/or the camelback prior to curing. In relugging a heavy duty tire, such as a tire for large tractors, earth movers, etc. the lugs are positioned either directly onto the crown surface of the tire, or when the process disclosed in Pat. No. 3,511,291 is employed, onto the outer surface of the camelback strip, or base stock. Here again, it is absolutely essential to remove any entrapped air between the undersurface of the lugs and the outer or upper surface of the tire carcass crown or the base stock. Again, the stitching should begin at the center of the crown and move outwardly toward the tire sidewall to remove entrapped air. Moreover, lugs for heavy duty, pneumatic tires may have various configurations, and are positioned at varying angles on the tire crown surface. Thus in each case a problem is presented in the stitching operation which requires the maintenance of the roller in a stitching apparatus in constant pressing contact with the lugged surface as it moves transversely from the center crown toward the tire sidewall. Additionally, certain tires are provided having angular, or curved, lugged or crown surfaces. In that case, a roller on a tire stitching machine must move along the angular path defined by the lugs or crown and at the same time, exert a substantially constant pressure on the base stock and/or the lugs on the base stock or crown surface for removing any entrapped air between the respective surfaces and for providing an efficiently stitched bond.

Pat. No. 2,734,553 discloses one method and apparatus for rebuilding pneumatic tires in conventional fashion wherein a strip of camelback material is applied to a buffed tire carcass and thereafter has a tread design molded therein during vulcanization of the camelback in a tread mold. There, camelback material is stitched onto a buffed tire carcass by an operator manually operating a stitcher roller apparatus. That stitcher apparatus permits of little or no control over the force applied to a camelback during the stitching operation. Pat. No. 2,279,269 also discloses a method and apparatus for applying camelback material to a buffed tire carcass. There, camelback material is stitched to the tire carcass by means of a plurality of cooperating rollers mounted upon appropriate supports and adapted to contact and apply pressure to the camelback material. That apparatus, though providing an effectively stitched camelback strip to a tire carcass has little application in relugging heavy-duty, pneumatic tires where uniform stitching pressure must be applied in a pre-selected fashion to varying, often irregular lug surfaces.

This invention provides an improved stitching machine that substantially overcomes the disadvantages of known stitching machines. The invention further provides an improved stitching machine for rapidly and efficiently stitching lugs to a tire crown or base stock surface for relugging that surface. Moreover, the invention provides an improved stitching machine for efficiently stitching lug materials to a tire crown or base-stock surface where the lugs comprise irregular or curved forms or where the lugs are positioned at varying angles upon the tire carcass.

SUMMARY OF THE INVENTION

This invention provides an improved stitching machine for rebuilding or renewing heavy-duty pneumatic tires, particularly for rebuilding such tires bearing a lug-type tread. The stitching machine comprises a fixed frame means having movably mounted thereon a carriage means. The carriage means may be selectively advanced and retracted on the frame means. Preferably the carriage means is movably mounted on said frame means through rollers and is advanced and retracted thereon to selected locations by suitable drive means, most preferably a motor operably connected to a screw.

The carriage means includes a swivel frame means having operably mounted thereon stitcher roller means adapted to abut the surface of a tire being rebuilt. The stitcher roller means is preferably mounted upon an arm which is operably connected to means, such as a piston, for urging the roller means against a tire being rebuilt at a preselected force. The swivel frame means is mounted upon the carriage in a fashion whereby the swivel frame may be swiveled and maintained in selected tilted or angular positions with respect to a tire being rebuilt. Preferably the swivel frame is maintained in those selected positions by a depending pair of strap means.

The roller means on said arm is further operably mounted on said swivel frame for transverse movement with respect thereto whereby said roller means, when forced by said piston means against a lug upon a tire being rebuilt, may move over the entire surface thereof along a desired, preselected path. Preferably the roller means is mounted for said transverse movement by means of a pivot-mount, most preferably a pivot-mount between said piston and said swivel frame.

Suitable means are provided for controlling said rollers transverse movement and preferably include a pair of spaced-apart transverse members on said swivel frame between which said arm for said roller may move transversely of said swivel frame. Drive means for controlling the direction and rate of the transverse movement of said arm, and hence of said roller are additionally provided whereby said roller may efficiently exert a preselected, substantially constant force against a lug being stitched to a tire carcass, or to camelback material on said carcass, regardless of the overall configuration of the lug or tire carcass and regardless of the angle at which the lug may be placed upon the tire surface.

Other advantages and details of the invention will become apparent by reference to the appended drawings and as the following more detailed description thereof proceeds.

DESCRIPTION OF THE PREFERRED EMBODIMENTS

Figure 1:
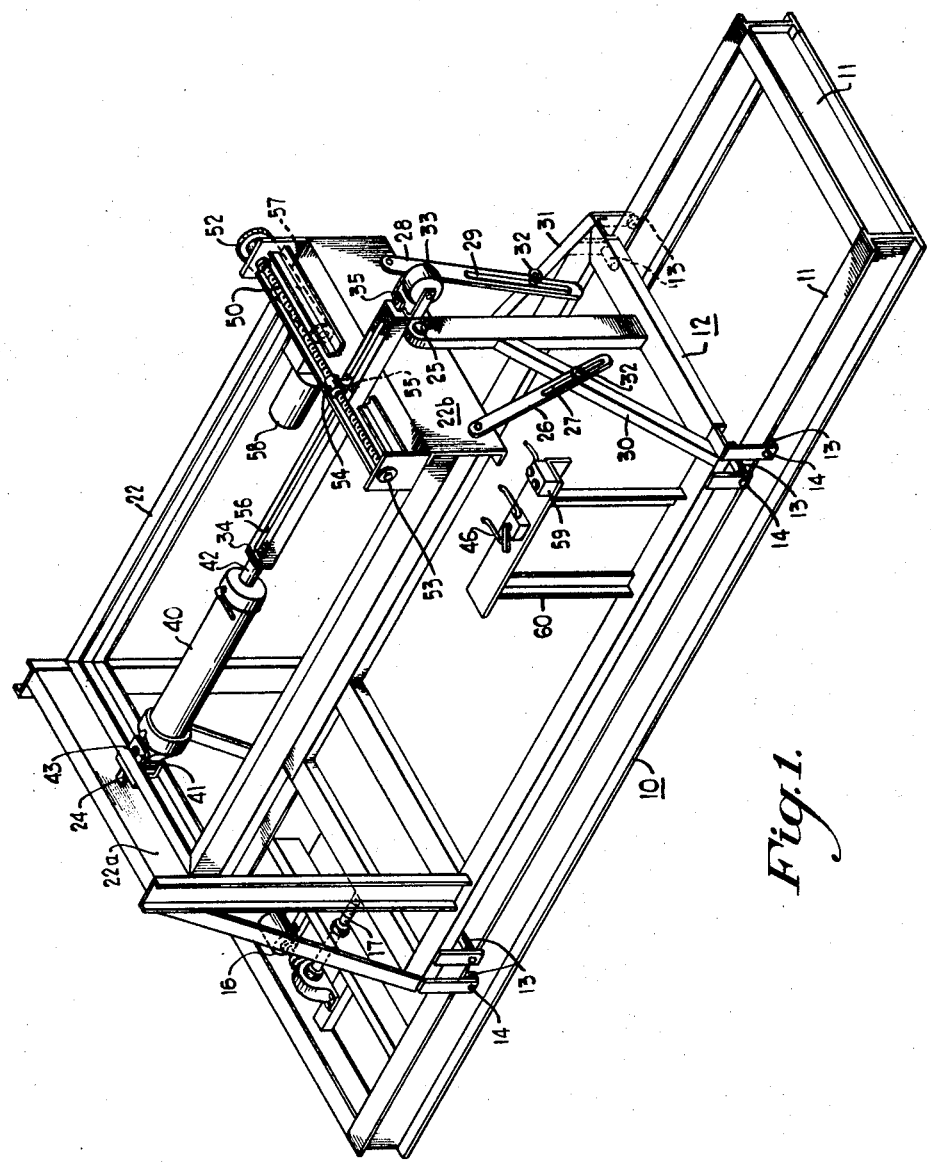
FIG. 1 is a perspective view of a preferred stitcher apparatus according to the invention.
Figure 2:
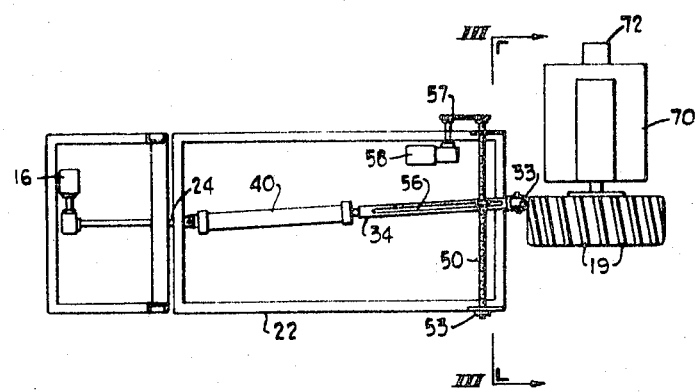
FIG. 2 is a shematic top plan of stitcher apparatus according to the invention in relation to a tire being relugged.

Referring now to FIG. 1, a stitcher machine according to the invention is shown including a fixed base or frame 10 having movably mounted thereon a frame-like carriage 12. Frame 10 preferably comprises a plurality of steel angles 11 formed rigidly into a rectangle. Carriage 12 is movably mounted upon fixed frame 10 by suitable means, such as roller pairs 13, journaled by pins 14 in members 15 depending from carriage 12. Drive means are provided for selectively advancing and retracting carriage 12 on frame 10. In FIG. 1 a motor 16 is provided for driving a threaded shaft, or screw drive, 17 operably connected to carriage 12 whereby activation of motor 16 may drive carriage 12 to selected locations on fixed frame 10. The primary function of advancing and retracting carriage 12 as heretofore described is to permit the stitcher apparatus to be employed for rebuilding different sized tires, and to be retacted for mounting a tire 18 on a suitable support 70 (FIG. 2).

Carriage 12 includes a swivel frame 22 mounted thereon, e.g., by shafts 24 and 25 journaled in respective members 22a and 22b of swivel frame 22. Swivel frame 22 may be rotated, or swivelled, about shafts 24 and 25 in a fashion whereby the swivel frame may be positioned and maintained in selected tilted or angular positions with respect to a tire 18 being rebuilt. Preferably swivel frame 22 is maintained in a selected angular position by adjustable means such as a pair of rigid metallic straps 26 and 28 depending downwardly of swivel frame member 22b. Each of the straps is pivotally pinned to swivel frame 22b and each contains a slot, 27 and 29, respectively therethrough. Straps 26 and 28 are adapted to be fixedly compressed against carriage strut members 30 and 31, respectively for selectively positioning swivel frame 22 at a desired position. The straps may be fixedly compressed against members 30 and 31 by threaded bolts 32 passing through and engaging respective slots 27 and 29. In that fashion swivel frame may be positioned in infinitely varying locations.

A stitcher roller 33 is operably rotably mounted upon swivel frame 22. Roller 33 is mounted upon an arm 34 in a conventional fashion as on an axle in bifurcated member 35 which is affixed to arm 34. It should be noted here that various types of stitcher rollers may be mounted upon arm 34. For example a roller 33 may be mounted in a clevis-type mounting (not shown) whereby the roller may be pinned at various positions in the mounting such that the longitudinal axis of roller 33 may be located at various angles with the longitudinal axis of arm 34.

Arm 34 is operably connected at one end to means, such as piston cylinder asembly 40, for urging roller 33 against the surface of a tire being rebuilt at a preselected force. In FIG. 1 a piston rod 42 forms the connection between arm 34 and piston cylinder 40. The piston cylinder is arranged to receive and exhaust a suitable fluid, such as air to advance and retract arm 34, and hence roller 33, and maintain the same pressure upon a tire crown surface, or lug surface, as roller 33 is urged against the surface and moves from the center of a tire crown toward the tire side wall in a stitching operation. Suitable control means 46 are provided for supplying fluid at a given pressure to cylinder 40.

Roller 33 is further operably mounted on swivel frame 22 for transverse movement with respect thereto whereby roller 33, when forced by piston cylinder 40 against a tire crown surface or the like, may move over the entire surface thereof along a desired, preselected path. To that end of pivot mount 41 is provided for piston cylinder 40 whereby piston 40 may pivot about, e.g., a pin 43 in pivot mount 41 for moving roller 33 transversely of swivel frame 22. Moreover, suitable means are provided for controlling the transverse movement of roller 33 in swivel frame 22 and preferably includes a first transverse member 22b of swivel frame 22 (as shown) for supporting arm 34 having roller 33 mounted thereon and defining the transverse plane of travel of the roller. Drive means are provided for controlling the direction and rate of travel of roller 33 transversely of the swivel frame. Mounted on the front end of swivel frame 22 is a threaded rod 50 connected at one end to, e.g., a sprocket 52 and at the other end to a bearing 53. An actuator means 54 is provided having a threaded bore therethrough adapted to threadably receive rod 50. Actuator means 54 includes a depending tongue portion 55 adapted to pass into and be received by a groove, or slot 56 in arm 34 for longitudinal movement therein. Rotation of threaded rod 50 by sprocket 52 results in transverse movement of actuator means 54 and hence of arm 34 and roller 33 transversely of swivel frame 22. Sprocket 52 may be operably connected by means of a chain 57 to a drive motor 58 which is, in turn, connected to suitable controls 59 on a control panel 60 whereby actuation of drive motor 58 may rotate threaded rod 50 to move roller 33 transversely.

Figure 3:
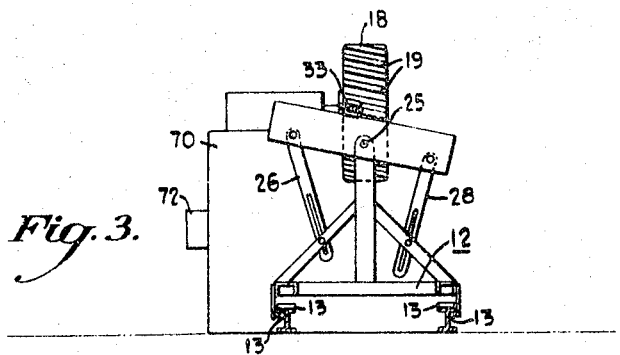
FIG. 3 is a view along line III—III of FIG. 2.

In FIGS. 2 and 3 is schematically illustrated the relugging of a heavy duty tire employing the apparatus of the invention. There, a tire 18 is mounted upon a tire support apparatus 70 having drive means for rotating tire 18 on support apparatus 70. Drive means 72 and support apparatus 70 for tire 18 may be of conventional type such as that shown in Pat. No. 3,511,291 wherein a plurality of fingers (not shown) are adapted to pass into the center opening of tire 18. The fingers are adapted to expand outwardly from the center opening until contact is made with the inner rim portion of a tire to thereby tightly grip (from within) the tire. Once having been firmly grasped or mounted in tire mounting apparatus 70, a tire 18 may then be rotated to various working positions. A plurality of lugs 19 are provided on tire 18 for stitching thereto. Movable carriage 12 is advanced along fixed frame 10 until roller 33 is in desired juxtaposition with respect to a lug 19. Thereafter, a preselected pressured fluid supply is supplied to piston cylinder 46 for urging roller 33 against the surface of a lug 19 beginning at the center of the tire crown carcass of tire 18. Motor 58 may then be activated for driving threaded rod 50 and hence moving roller 33 transversely of swivel frame 22 while at the same time maintaining a constant preselected force on lug 19 for stitching to tire 18. Since, in the figures, lugs 19 are to be stitched to tire 18 at an angle with respect to the axis of the tire, swivel frame 22 is positioned such that the transverse plane of travel of roller 33 exactly conforms to the angle at which the lugs are to be stitched. Moreover since the lugs being stitched in FIGS. 2 and 3 comprise straight lugs, swivel frame may be maintained in its illustrated position by fixedly securing straps 26 and 28 as shown in FIG. 3. As previously described, stitching is begun at the center of the tire crown, or lug, and thence outwardly towards the tire sidewalls. After an entire lug, or alternately a half-lug, has been stitched, tire 18 is rotated on mounting apparatus until the next lug is in-line with the stitching apparatus.

Figure 4:
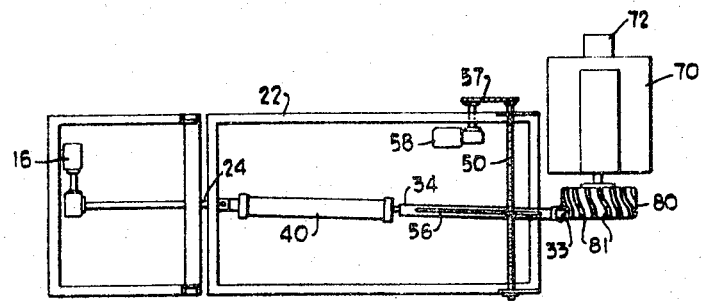
FIG. 4 is a schematic top plan of stitcher apparatus according to the invention in relation to a tire being relugged and having differing overall dimensions and lug design from the tire in FIGS. 2 and 3.

In FIG. 4 a tire 80 is mounted for relugging on mounting apparatus 70. Tire 80 has overall dimensions differing from those of tire 18 and additionally is provided with curved lugs 81. Stitching of lugs 81 onto tire 80 proceeds much the same as heretofore described. Roller 33 may be directed to accurately follow the surface of a lug 81 either by compensating for the curvature of the lug by rotating tire 80 during stitching or by changing the tilt of swivel from 22 during stitching. In the latter case swivel frame 22 is operated in a non-fixed fashion and may be tilted to compensate for tread irregularites while at the same time constantly applying a desired, preselected force to the surface of a lug 79.

The foregoing has described the invention and certain preferred embodiments thereof. It should be expressly understood however that the invention is not necessarily limited to the precise embodiments disclosed therein but may be variously practiced within the scope of the following claims.

What is claimed is:

1. A stitching machine for rebuilding pneumatic tires comprising:
   (a) fixed support means,
   (b) carriage means movably mounted on said support means whereby said carriage means may be advanced and retracted on said support means,
   (c) swivel frame means mounted on said carriage means and adapted to tilt to varying preselected angles with respect to the axis of a tire being rebuilt,
   (d) roller means on said swivel frame means, said roller means being operably attached to means for urging said roller means against said tire being rebuilt at a preselected force,
   (e) means for moving said roller means transversely of said swivel frame means and for controlling said transverse movement including threaded rod means having mounted for movement thereon actuator means,
   (f) means for rotating said threaded rod means whereby rotation thereof produces movement of said actuator means transversely of said swivel frame means,
   (g) said actuator means being operably attached to said roller means whereby transverse movement of said actuator means produces corresponding transverse movement of said roller means and whereby said roller means may move over the surface of said tire being rebuilt along a desired, preselected path.

2. The stitching machine as set forth in claim 1 wherein said desired, preselected path is over the surface of a lug on said tire being rebuilt.

3. The stitching machine as set forth in claim 1 wherein said means for urging said roller against said tire being rebuilt comprises a piston cylinder, and including means for activating said piston cylinder.

4. The stitching machine as set forth in claim 1 wherein said means for rotating said rod includes sprocket means operably connected to drive means therefor and further including means for selectively actuating said drive means.

5. The stitching machine as set forth in claim 1 including means for maintaining said swivel frame means at any of said preselected angles.

6. The stitching machine as set forth in claim 4 wherein when said means for maintaining said swivel frame means at said angles comprises a pair of metallic straps pivotally depending from said swivel frame means, each member of said pair adapted to be fixedly compressed against said carriage means for selectively positioning and maintaining said swivel frame means at any of said angles.

References Cited
UNITED STATES PATENTS

| | | | |
|---|---|---|---|
| Re. 27,006 | 12/1970 | Ragan | 156—96 |
| 2,009,524 | 7/1935 | Schmidt | 156—96 X |
| 2,406,093 | 8/1946 | Miller | 156—409 |
| 3,423,272 | 1/1969 | Sornsen | 156—96 X |
| 3,546,043 | 12/1970 | Miksch | 156—410 |

ROBERT E. BURNETT, Primary Examiner

C. B. COSBY, Assistant Examiner

U.S. Cl. X.R.

156—96, 129, 408, 410